Dec. 3, 1929.  C. C. McKNIGHT ET AL  1,737,889
PIPE CUTTING APPARATUS AND METHOD
Filed July 27, 1926
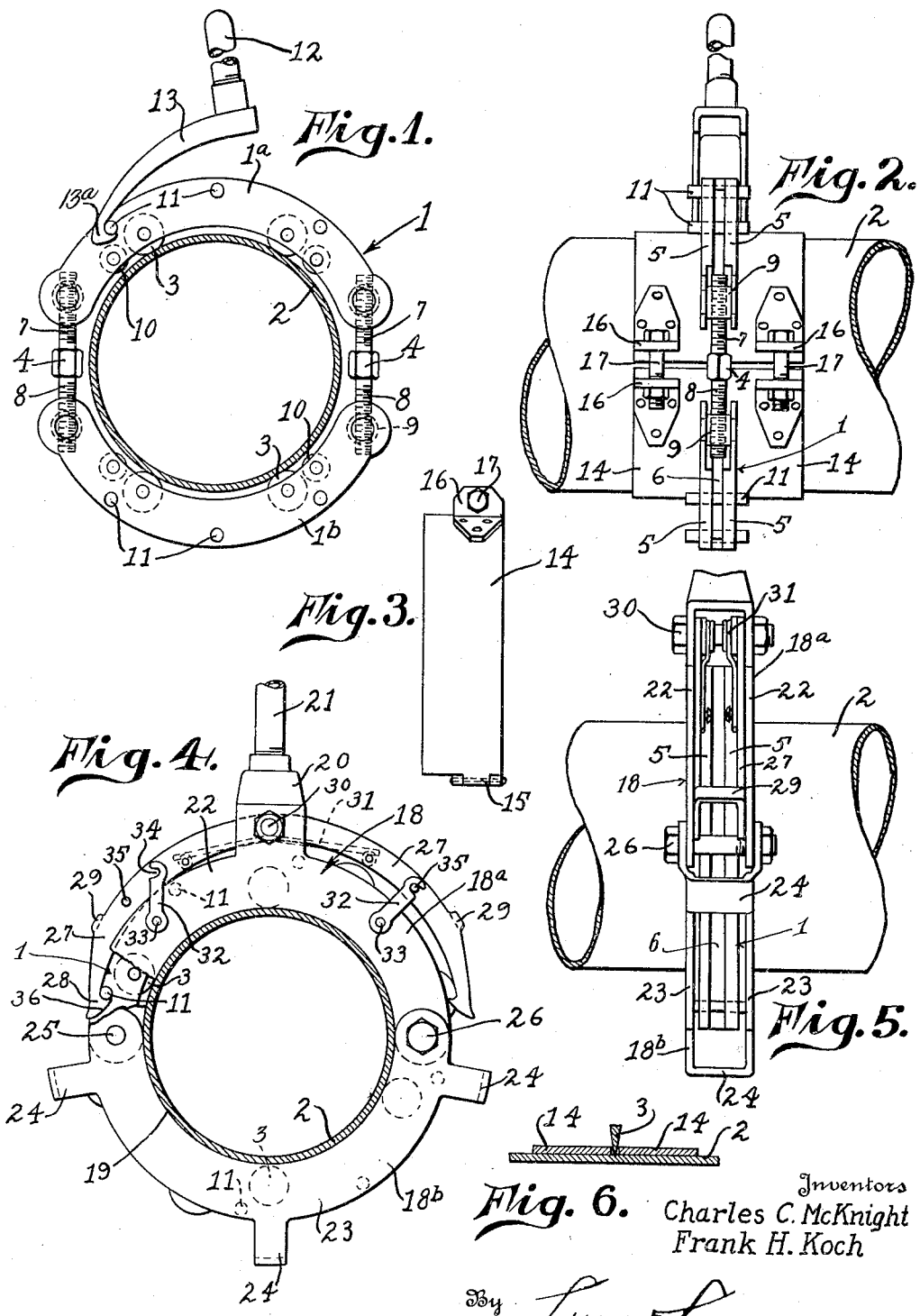
Inventors
Charles C. McKnight
Frank H. Koch
By Lyon & Lyon
Attorneys Patented Dec. 3, 1929

1,737,889

UNITED STATES PATENT OFFICE

CHARLES C. McKNIGHT, OF LA MIRADA, AND FRANK H. KOCH, OF LOS ANGELES, CALIFORNIA

PIPE-CUTTING APPARATUS AND METHOD

Application filed July 27, 1926. Serial No. 125,168.

This invention relates to the cutting of pipe. It is frequently necessary to cut pipe which is located in a position where it is impossible to apply a rotary cutter and rotate the same continuously by means of a handle moving continuously around the pipe; for example, where two lines of pipe are located so close together that one of the pipes would interfere with the rotation of a handle around the adjacent pipe.

The general object of this invention is to provide a simple method and apparatus for cutting pipe in such a situation, and while the invention is especially applicable for cutting pipe under the circumstances suggested above, features of the invention may be used when applying the pipe cutters in operating where the space around the pipe is unobstructed.

A further object of the invention is to improve the general construction of pipe cutters of this character.

One of the objects of the invention is to provide apparatus including rotary cutters which can be applied to the pipe and operated so as to produce a guide cut in the outer surface of the pipe, and to provide means for continuing the rotation of the cutters thereafter while guiding them in the guide cut.

A further object of the invention is to provide a simple construction for the apparatus which will facilitate its application around the pipe and which will facilitate the rotation of the cutters with a step by step movement around the pipe.

Further objects of the invention will appear hereinafter.

The invention consists in the novel method and in the novel parts and combination of parts to be described hereinafter, all of which contribute to produce an efficient pipe cutting apparatus and method.

In the drawing:

Figure 1 is a cross section through a pipe, and illustrating a cutter frame with cutter wheels, and also showing a special handle which is employed for rotating the cutter frame to produce a guide cut in the pipe.

Figure 2 is a side elevation of the cutter frame showing a short section of the pipe to which the same is applied, and also showing guide bands which we apply on each side of the cutter wheels to guide them in forming the guide cut.

Figure 3 is a plan of one of the guide bands removed from the pipe.

Figure 4 is a cross section through a pipe and showing the apparatus during the operation of completing the cut after the guide cut has been formed, certain parts being broken away; that is to say, this view illustrates a ratchet frame which cooperates with the cutter frame to enable it to be rotated with a step by step movement.

Figure 5 is a side elevation of the apparatus shown in Fig. 4, and showing a short section of the pipe to which the same is applied, certain parts being broken away.

Figure 6 is a longitudinal section taken through the wall of the pipe and passing through the guide bands so as to illustrate how they guide the cutters when the guide cut is being formed.

In practicing our method of cutting a pipe by means of cutter wheels, we guide the cutter wheels on the pipe and rotate the same around the pipe to form a guide cut in the outer surface of the pipe; after this is done, we utilize the guide cut to guide the cutters and we press the cutters into the guide cut and continue their rotation around the pipe.

Our apparatus preferably includes a cutter frame 1 constructed so that it can be placed around a pipe 2. This cutter frame carries rotary cutter wheels 3 which have tapered cutting edges, and which are disposed at opposite points on the pipe. The cutter frame is constructed of arcuate sections, preferably two in number, and indicated by the reference numerals 1$^a$ and 1$^b$; the ends of the said sections being connected together by detachable take-up connections, preferably in the form of means including one or more turnbuckles 4. Each of the sections 1$^a$ and 1$^b$ is preferably constructed of two plates 5 which are secured together with a space or gap 6 between them, and in these spaces or gaps 6 the cutter wheels 3 are mounted. The cutter wheels are of course disposed in the same plane so that when the cutter frame is rotated, they will "track" in the same line around the pipe. The turn-buckles 4 have their middle portions formed like "hex-nuts", and they have two threaded shanks 7 and 8 which extend in opposite directions and have threads of opposite character. Each of the threaded shanks 7 and 8 is threaded through a swivel pin 9 held between the plates 5.

In addition to this, we also prefer to provide guide rollers 10 fastened between the plates 5 which will bear on the outer surface of the pipe at about the time the edges of the cutter wheels have passed completely through the wall of the pipe. The cutter frame 1 is provided with ratchet means to facilitate the rotation of the cutter frame with a step by step movement, and this ratchet means is preferably in the form of projecting pins 11, spaced circumferentially around the axis of the frame, and which pass through the plates 5 so that their outer ends project from the outer faces or outer sides of the sections of the cutter frame. In order to apply the cutter frame to the pipe, it is merely necessary to unscrew one of the turn-buckles and then connect the sections around the pipe as illustrated in Fig. 1. In operating the device, the turn-buckles should be tightened up an equal amount so that the cutter wheels will be disposed diametrically opposite to each other. We prefer to provide two cutter wheels on each of the sections of the cutter frame.

After the cutter frame has been applied to the pipe, as illustrated in Fig. 1, the turn-buckles 4 should be tightened up so that the edges of the wheels are pressed with considerable force against the wall of the pipe. We then attach guiding means to the pipe on each side of the cutter wheels so as to guide them as they pass around the pipe.

In order to rotate the cutter frame and produce the guide cut in the pipe, we provide a handle or lever 12 having a curved dog 13 at its inner end, having a hook or hooks 13ª which engage over the projecting ends of the pins 11. Fig. 1 illustrates this rotating handle in the act of being applied to the cutter frame. After hooking the pawl 13 onto the pins, as illustrated in Fig. 1, the handle 12 will be pulled down so that the pawl 13 rests against the side of the cutter frame, and after this occurs, the handle 12 should be rotated to the right. This handle 12 would be rotated as far as possible in this direction and then it would be disengaged from the pins and applied to the projecting ends of the next pin 11. In this way, the rotation would be continued in one direction until a guide cut of sufficient depth is formed in the wall of the pipe to guide the cutters. The guiding means for the cutters is preferably in the form of two split rings or bands 14 (see Figs. 2 and 3). Each of these bands has a hinge connection 15 at one side, and the split end of the band is provided with angle clips 16 which receive tightening bolts 17 for tightening the bands on the pipe.

After a guide cut has been formed of sufficient depth to guide the cutters, we remove the guide bands 14 as they would interfere with the progress of the cutters by reason of the taper in the cutting edges, and we then make use of a ratchet frame 18 (see Figs. 4 and 5) for continuing the rotation of the cutter frame. This ratchet frame is also preferably constructed of sections like the cutter frame, which may be disconnected to enable it to embrace the pipe like the cutter frame. In the present instance, the ratchet frame is made of two sections 18ª and 18ᵇ; in other words, the ratchet frame is formed of two annular plates with central openings 19 which fit the diameter of the pipe to which the ratchet frame is applied. The section 18ª is formed with a hub 20 near its middle point, to which a handle or lever 21 is attached for rocking the ratchet frame to and fro on the axis of the pipe, and the body of the section 18ª consists of two plates 22 which are disposed apart so that their inner faces can lie against the outer faces of the cutter frame.

The section 18ᵇ of the ratchet frame consists of two separated plates 23 which are preferably connected together by bridge bars 24, which are offset so as to provide clearance for the cutter frame as it rotates around the pipe. The section 18ᵇ is connected at one side by means of a pivot bolt 25 with the section 18ª, and at the other side a detachable bolt or pin 26 is provided to enable the ratchet frame to be opened up and then applied around the pipe, as illustrated in Fig. 4.

In order to enable the ratchet frame to rotate the cutter frame, we provide ratchet means to cooperate with the ratchet means or pins 11. For this purpose, we prefer to provide two double pawls 27, each double pawl having a pair of hooks 28 at its free end for engaging the projecting ends of the pins 11; near their ends, the two bars which form the double pawl are connected by a cross bar 29 which may be made integral with the side bars of the pawl. The two pawls 27 are mounted on a common pivot bolt 30, and each double pawl is pressed inwardly toward the pipe by a coil spring 31 (see Fig. 5).

It should be understood that only one of the pawls 27 is in operation at a time, the other pawl being locked in an inoperative position. For this purpose, we provide the side of the ratchet frame with two hooks 32, each hook mounted on a pivot 33 and having a socket 34 on its end to engage a pin 35 on the side of the corresponding pawl 27.

As illustrated in Fig. 4, the pawls are set for rotation of the cutter frame in a clockwise direction. In this connection, it should be understood that when the handle 21 is moved toward the left, a cam edge 36 on the hook 28 will ride over the pins 11 in succession, and when the lever 21 is rocked toward the right, the hooks of the pawl will engage the ends of the pins 11 and transmit rotary movement to the cutter frame. In this way, the cutters will cut deeper and deeper into the guide cut. From time to time, the pipe fitter will tighten up the turn-buckles 4 so as to maintain a sufficient pressure of the cutting edges of the cutter wheels at the bottom of the cut.

The mode of operation of the apparatus is briefly as follows: The cutter frame 1 is opened up by disconnecting one of the turn-buckles 4 and is applied around the pipe as illustrated in Fig. 1. The turn buckles 4 are then tightened up so that the cutting edges of the wheels 3 press forcefully against the face of the pipe. The lever 12 is then applied in the manner indicated in Fig. 1, so as to give the rotary frame a step by step rotation in a clockwise direction. If it is inconvenient to rotate the cutter in this direction, the rotating handle or lever 12 would be applied in a reverse position. Before rotating the cutter frame by means of the lever 12, the guide bands 14 are applied so as to guide the cutters in their rotation. After the guide cut has been formed in this way, the bands 14 are removed and the ratchet frame illustrated in Figs. 4 and 5 is placed in position by disconnecting its sections at the bolt 26, and then securing the parts together so that the ratchet frame embraces the pipe as illustrated. Then either one of the double pawls 27 is locked by means of its latch 32, depending upon what direction it is desired to rotate the cutter frame. The lever 21 is then rocked to and fro through an angle, so that the pawls 27 cooperate with the pins 11 to produce a step by step rotation of the cutter frame. As this operation progresses, the turn-buckles 4 should be tightened up from time to time so as to keep the cutters 3 pressed firmly down in the guide cut, which guides them as they rotate around the pipe.

What we claim is:—

1. In a pipe-cutting apparatus, the combination of a cutter frame comprising detachable sections capable of embracing the pipe, cutters with tapered cutting edges, carried by the sections, a pair of detachable guide bands constructed to be removably secured on the pipe on each side of the cutters, said cutter frame having ratchet means to cooperate with a ratchet device to rotate the cutter frame and form a guide cut in the pipe, a ratchet frame, with detachable sections capable of being set around the pipe after the guide bands have been removed, a handle carried by the ratchet frame, and a pawl carried by the ratchet frame cooperating with the ratchet means on the cutter frame for rotating the same with a step by step movement, to rotate the cutters in the guide cut and complete the cut through the pipe wall.

2. In a pipe-cutting apparatus, the combination of a cutter frame carrying cutters with tapered cutting edges, comprising two sections with turn-buckles connecting the sections together and enabling the same to be placed around the pipe and tightened so as to press the cutters against the pipe, a pair of detachable guide bands constructed to be removably secured on the pipe on each side of the cutters, said cutter frame having ratchet means to cooperate with a ratchet device to rotate the cutter frame and form a guide cut in the pipe, a ratchet frame with detachable sections capable of being set around the pipe after the guide bands have been removed, a handle carried by the ratchet frame, and a pawl carried by the ratchet frame cooperating with the ratchet means on the cutter frame for rotating the same with a step by step movement, to rotate the cutters in the guide cut and complete the cut through the pipe wall.

3. In a pipe-cutting apparatus, the combination of a cutter frame with cutters, comprising sections with connecting means enabling the sections to be connected together around the pipe, a pair of detachable guide bands constructed to be removably secured on the pipe on each side of the cutters, said cutter frame having ratchet means to cooperate with a ratchet device to rotate the cutter frame and start the cut in the pipe, a ratchet frame with detachable sections capable of being set around the pipe and against the side of the pipe at the cutter frame after the guide bands are removed, and having a pair of ratchet pawls for engaging the said ratchet means to rotate the cutter frame in either direction, to complete the cut through the pipe wall, means for locking either of said ratchet pawls in an inoperative position, and a handle on the ratchet frame for rocking the same on the pipe.

4. In a pipe cutting apparatus, the combination of a cutter frame comprising two sections, a pair of rotary cutters carried by each section, means including a turnbuckle connecting the ends of the sections and enabling the same to be connected together around the pipe, said cutter frame having ratchet means to cooperate with the ratchet device to rotate the cutter frame, a ratchet frame having two annular discs with openings to receive the pipe so that the cutter frame can be rocked to and fro on the axis of the pipe, a handle for rocking the cutter frame, and a spring-pressed ratchet pawl carried by the cutter frame to cooperate with the ratchet means for rotating the cutter frame.

5. In a pipe cutting apparatus, the combination of a cutter frame with cutters, comprising sections with connecting means enabling the sections to be connected together around the pipe, each cutter section consisting of a pair of arcuate plates disposed apart to form a slot with the cutters mounted in the slot, projecting pins on the outer faces of the plates, a ratchet frame constructed to be set around the pipe at the cutter frame, having a pair of annular plates with a space between them to receive the cutter frame, a handle for rocking the ratchet frame on the axis of the pipe, and a pawl carried by the ratchet frame to cooperate with the pins to rotate the cutter frame.

6. In a pipe cutting apparatus, the combination of a cutter frame with cutters, comprising sections with connecting means enabling the sections to be connected together around the pipe, the said sections of the cutter frame having projecting pins on their outer sides, a ratchet frame constructed to be set around the pipe at the cutter frame, having a pair of annular plates with a space between them to receive the cutter frame, a handle for rocking the ratchet frame on the axis of the pipe, and a double pawl carried by the ratchet frame to cooperate with the pins to rotate the cutter frame.

7. In a pipe cutting apparatus, the combination of a cutter frame with cutters, comprising sections with connecting means enabling the sections to be connected together around the pipe, the said sections of the cutter frame having projecting pins on their outer sides, a ratchet frame constructed in sections and comprising a pair of annular plates with central openings to receive the pipe and enable the ratchet frame to be rocked to and fro on the axis of the pipe, said annular plates having offset connecting bars connecting the same together and permitting rotation of the cutter frame within the ratchet frame, a handle for rocking the ratchet frame on the axis of the pipe, and a double pawl pivotally mounted on the ratchet frame for engaging the projecting pins to enable the ratchet frame to rotate the cutter frame.

8. The method of cutting a pipe which consists in holding a plurality of cutter wheels in substantially the same plane and disposed around the periphery of the pipe, rotating the cutter wheels around the axis of the pipe so that they roll along the same line at their edges and penetrate the surface of the pipe to form a guide cut, guiding the cutters thereafter in the guide cut, pressing the cutters into the guide cut and continuing the rotation of the cutters on the axis of the pipe to complete the cut.

9. In a pipe cutting apparatus, the combination of a cutter frame comprising two arcuate sections each consisting of a pair of separated plates with rotary cutters carried by the plates, means including a take-up connection connecting the ends of the sections and enabling the same to embrace the pipe, a ratchet-frame having two arcuate sections detachably pivoted together and having an opening through the same to fit around the pipe, enabling the ratchet frame to bear against the pipe and rotate on its axis, each section of the ratchet frame consisting of two separated plates disposed respectively on the outer sides of the cutter-frame plates, a plurality of ratchet pins carried by the cutter frame and spaced circumferentially around its axis, and pawl-means carried by the ratchet frame to co-operate with the ratchet pins to rotate the cutter frame, said take-up connection affording means for tightening the cutters in the cut as the cutting operation progresses.

10. In a pipe cutting apparatus, the combination of a cutter frame comprising two arcuate sections each consisting of a pair of separated plates with rotary cutters carried by the plates, means including a take-up connection connecting the ends of the sections and enabling the same to embrace the pipe, a ratchet-frame having two arcuate sections detachably pivoted together and having an opening through the same to fit around the pipe, enabling the ratchet-frame to bear against the pipe and rotate on its axis, each section of the ratchet frame consisting of two separated plates disposed respectively on the outer sides of the cutter-frame plates, a plurality of ratchet pins mounted in the plates of the cutter-frame and having their ends projecting beyond the plates, said pins being spaced circumferentially around the axis of the cutter-frame, and pawls carried by the ratchet-frame to engage the projecting ends of the pins to rotate the cutter-frame, said take-up connection affording means for tightening the cutters in the cut as the cutting operation progresses.

11. In a pipe cutting apparatus, the combination of a cutter-frame comprising two annular plates spaced apart, with rotary cutters carried between the plates, means mounted on the frame for tightening the cutters around the pipe, a ratchet-frame having two separated annular plates disposed respectively adjacent the outer faces of the plates of the cutter-frame and held spaced apart, the inner edges of the plates of said ratchet-frame operating to bear against the pipe and enabling the ratchet-frame to rotate on its axis, a plurality of ratchet pins carried by the cutter-frame and spaced circumferentially around its axis, and pawl-means carried by the ratchet frame to co-operate with the ratchet pins to rotate the cutter-frame.

Signed at Buena Park, California, this 2nd day of July 1926.

CHARLES C. McKNIGHT.
FRANK H. KOCH.